(12) United States Patent
Marrotte et al.

(10) Patent No.: US 12,738,721 B2
(45) Date of Patent: Sep. 15, 2026

(54) ELECTRICAL BOX

(71) Applicant: The Wiremold Company, West Hartford, CT (US)

(72) Inventors: John R. Marrotte, Windham, CT (US); Daniel Parker Murray, West Hartford, CT (US); Shaun Eric Abbott, Wethersfield, CT (US); Michael Diamantoplos, Jr., Hartford, CT (US); John Arthur Bellemare, Jr., Cheshire, CT (US); Xinguo Chang, Dongguan City (CN); Hua Xiao, Dongguan City (CN)

(73) Assignee: THE WIREMOLD COMPANY, West Hartford, CT (US)

(*) Notice: Subject to any disclaimer, the term of this patent is extended or adjusted under 35 U.S.C. 154(b) by 160 days.

(21) Appl. No.: 18/528,946

(22) Filed: Dec. 5, 2023

(65) Prior Publication Data

US 2024/0186780 A1 Jun. 6, 2024

Related U.S. Application Data

(60) Provisional application No. 63/386,203, filed on Dec. 6, 2022.

(51) Int. Cl.
*H02G 3/00* (2006.01)
*H02G 3/08* (2006.01)
*H02G 3/12* (2006.01)

(52) U.S. Cl.
CPC ............ *H02G 3/088* (2013.01); *H02G 3/081* (2013.01); *H02G 3/12* (2013.01)

(58) Field of Classification Search
CPC ........... H02G 3/088; H02G 3/081; H02G 3/12
See application file for complete search history.

(56) References Cited

U.S. PATENT DOCUMENTS 10,020,645 B2 * 7/2018 Hemingway ............ H02G 3/14
11,159,005 B1 * 10/2021 Baldwin ................ H02G 3/088
2004/0123997 A1 * 7/2004 Drane .................... H02G 3/088 174/67
2010/0147547 A1 6/2010 Drane et al.
2010/0252552 A1 10/2010 Nikayin et al.
2018/0199452 A1 * 7/2018 Dumani .................. H02G 3/10

FOREIGN PATENT DOCUMENTS

FR 3041977 A1 * 4/2017 ............. E02D 29/14

OTHER PUBLICATIONS

Canadian Office Action for corresponding Canadian Patent Application No. 3,222,092 dated May 14, 2025 (6 pp.).

* cited by examiner

*Primary Examiner* — Pete T Lee
(74) *Attorney, Agent, or Firm* — McCormick, Paulding & Huber PLLC

(57) ABSTRACT

An electrical box includes a body, a cover, adjustable mounting brackets and a connection geometry for engagement with a connection geometry of a floor support structure. The adjustable mounting brackets are configured to be adjusted in the vertical direction to accommodate floor materials of different thicknesses so that a top surface of the electrical box is flush with a top surface of adjacent floor material(s). The electrical box houses electrical connection points such as electrical receptacles or data or audio/video connections that remain sheltered from the outdoor elements but are also easily accessible.

16 Claims, 11 Drawing Sheets

ELECTRICAL BOX

CROSS-REFERENCE RELATED TO APPLICATION

This application claims priority to U.S. Provisional Patent Application No. 63/386,203, filed Dec. 6, 2022, which is hereby incorporated by reference in its entirety.

TECHNICAL FIELD

The present disclosure relates to an electrical box configured to be mounted in raised floors, e.g., outdoor decks, roof patios, or the like, the electrical box housing electrical connection points such as electrical power receptacles or data or audio/video (AV) connections that remain sheltered from the environment but are also easily accessible.

BACKGROUND

Electrical power has been a part of modern life for more than a century and has become a familiar indoor convenience. Indoors, almost every appliance for daily use requires electrical power. However, outdoor access to electrical power cannot yet be described as convenient.

For those who use electrically powered equipment and devices outdoors, provision of electrical power presents immediate difficulties. For larger equipment and devices, batteries are not practical. While vertical wall-mounted receptacles are known for outdoor power distribution, such receptacles require use of an extension cord to distribute power to any significant distance from the wall. The inconveniences associated with use of an extension cord, such as a tripping hazard, essentially limit outdoor power distribution to locations near the wall-mounted receptacle.

In order to provide electrical power at locations distant from existing walls, various devices have been proposed. For example, post-mounted outdoor receptacles have been provided. However, the post-mounted receptacles can be visually obtrusive. Additionally, the post-mounted receptacles are prone to inadvertent displacement or damage due to their protruding structure.

Electrical boxes for mounting electrical connection points outdoors in the ground are known. For example, outdoor electrical box embodiments are disclosed in U.S. Pat. No. 10,020,645 to Hemingway et al., which is hereby incorporated by reference in its entirety. Moisture is one issue with enclosures installed in the ground. While some current electrical boxes attempt to prevent the electrical connection points from getting wet, they do so by sacrificing accessibility. Those current boxes are best suited for applications requiring a long-term electrical connection such that once the connection is made, a user does not need to often access that connection. Those current enclosures are not well suited for applications where a variety of devices that consume electrical power will be routinely connected or disconnected from the connection points. Other known outdoor electrical boxes do attempt to be accessible, but those boxes only make limited attempts to keep water from reaching the faces of the electrical receptacles and the contact points between the receptacles and the terminals of the plugs connected to the receptacles.

SUMMARY

Accordingly, it is desirable to have an electrical box that can be installed in a deck or patio outdoors and that can house electrical connection points that are highly accessible so that intermittent electrical connections can be made but that at the same time are protected from the elements so that the connection points are not damaged and do not present an electrocution hazard.

For example, on a floor surface of a deck or patio, it may be desirable to provide electrical receptacles for intermittent electrical connections, such as short-term lighting, power washers, and electric maintenance equipment, e.g., hedge trimmers and chain saws. It may also be desirable to provide data or AV connections in these locations, e.g., when no wireless network is available in the area. Desirably, the connection points will be easily accessible so that a user can plug and unplug devices as required. Additionally, the electrical box housing such receptacles or data or AV jacks should be able to keep water out of them.

According to the present disclosure, an electrical box may include a body defining an interior space, a cover attached to the body, the cover including a cover door configured to be moved from a closed position to an open position, and two adjustable mounting brackets arranged on opposite sides of the body each configured to support a floor material. The adjustable mounting brackets may be configured to be adjusted to a plurality of different positions in a vertical direction of the body.

These and other objects, features and advantages of the present disclosure will become apparent in light of the detailed description of embodiments thereof, as illustrated in the accompanying drawings.

DETAILED DESCRIPTION

Figure 1:
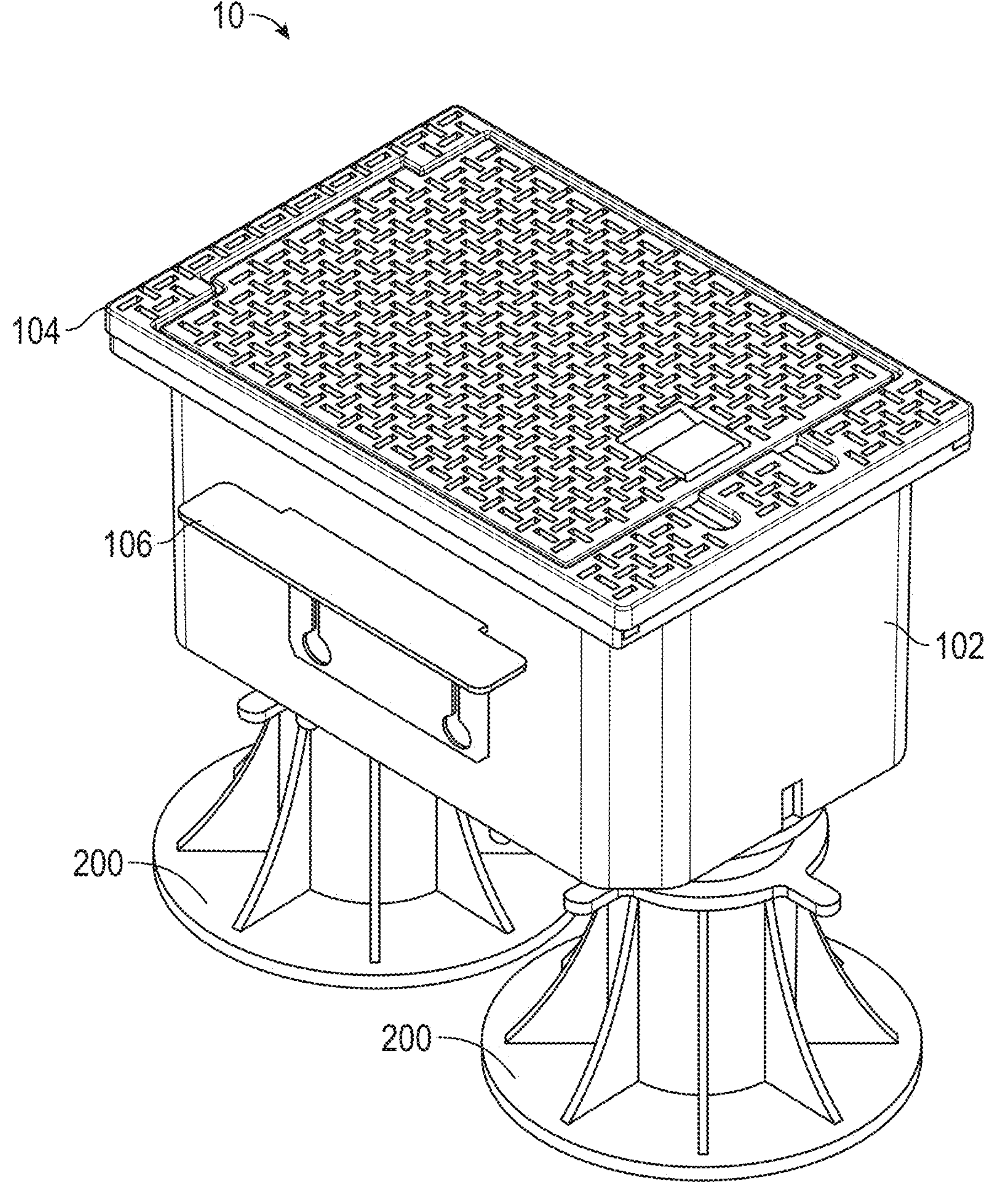
FIG. 1 shows a perspective view of an electrical box according to the present disclosure mounted on support structures.
Figure 2:
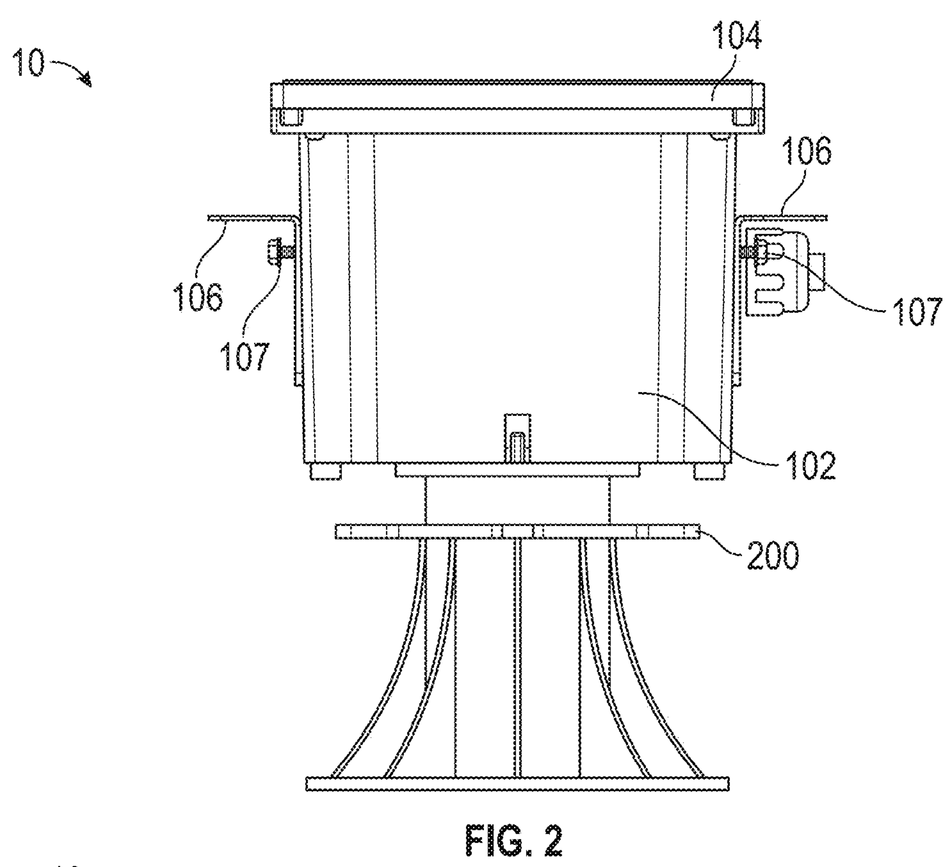
FIG. 2 shows a front view of the electrical box and support structures of FIG. 1.
Figure 3:
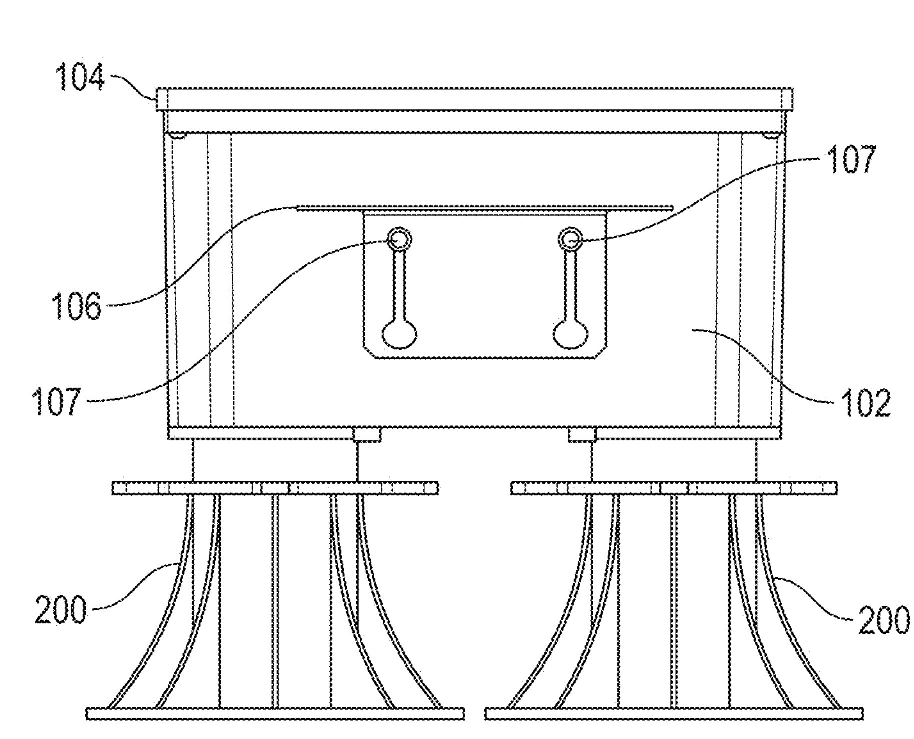
FIG. 3 shows a side view of the electrical box and support structures of FIG. 1.
Figure 4:
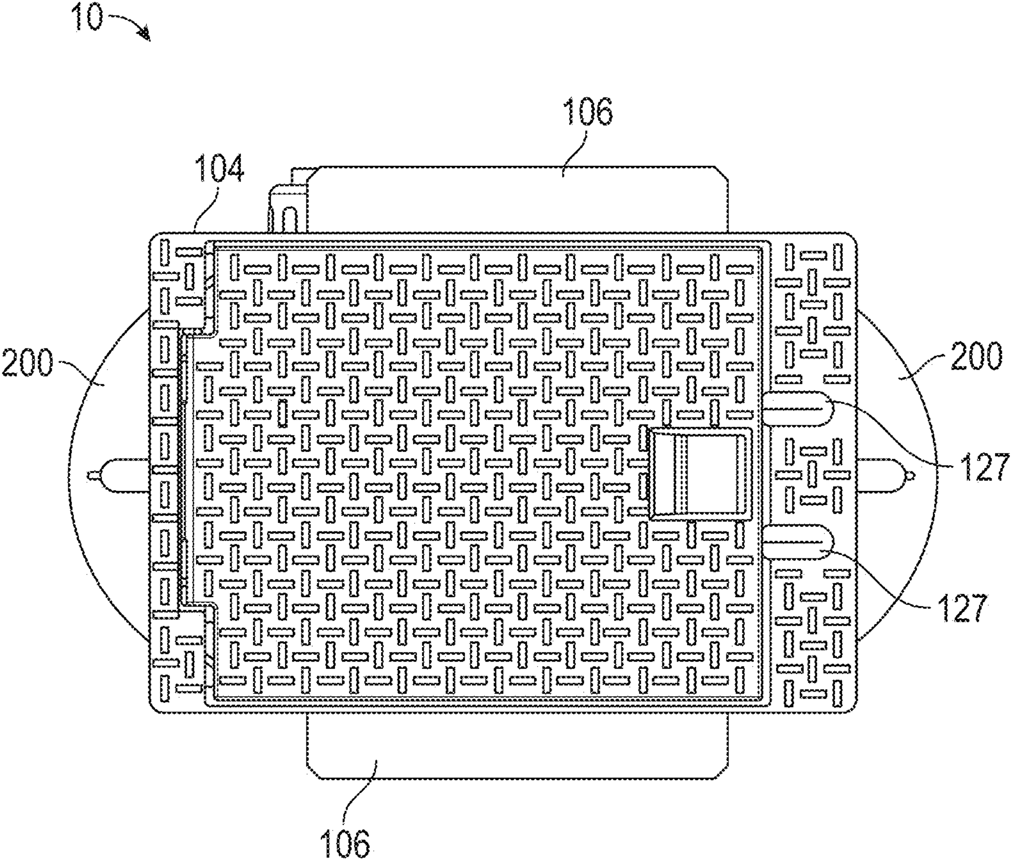
FIG. 4 shows a top view of the electrical box and support structures of FIG. 1.

Referring to FIGS. 1-4, an electrical box 10 is shown according to embodiments of the present disclosure. The electrical box 10 is typically configured for installation in a surface, particularly an outdoor floor surface such as a roof deck, porch, or patio, or the like. The electrical box 10 includes a body 102, a cover 104 and two adjustable mounting brackets 106 connected to opposite sides of the body 102 with fasteners 107. The electrical box 10 is shown supported by two known, conventional support structures 200.

Figure 5:
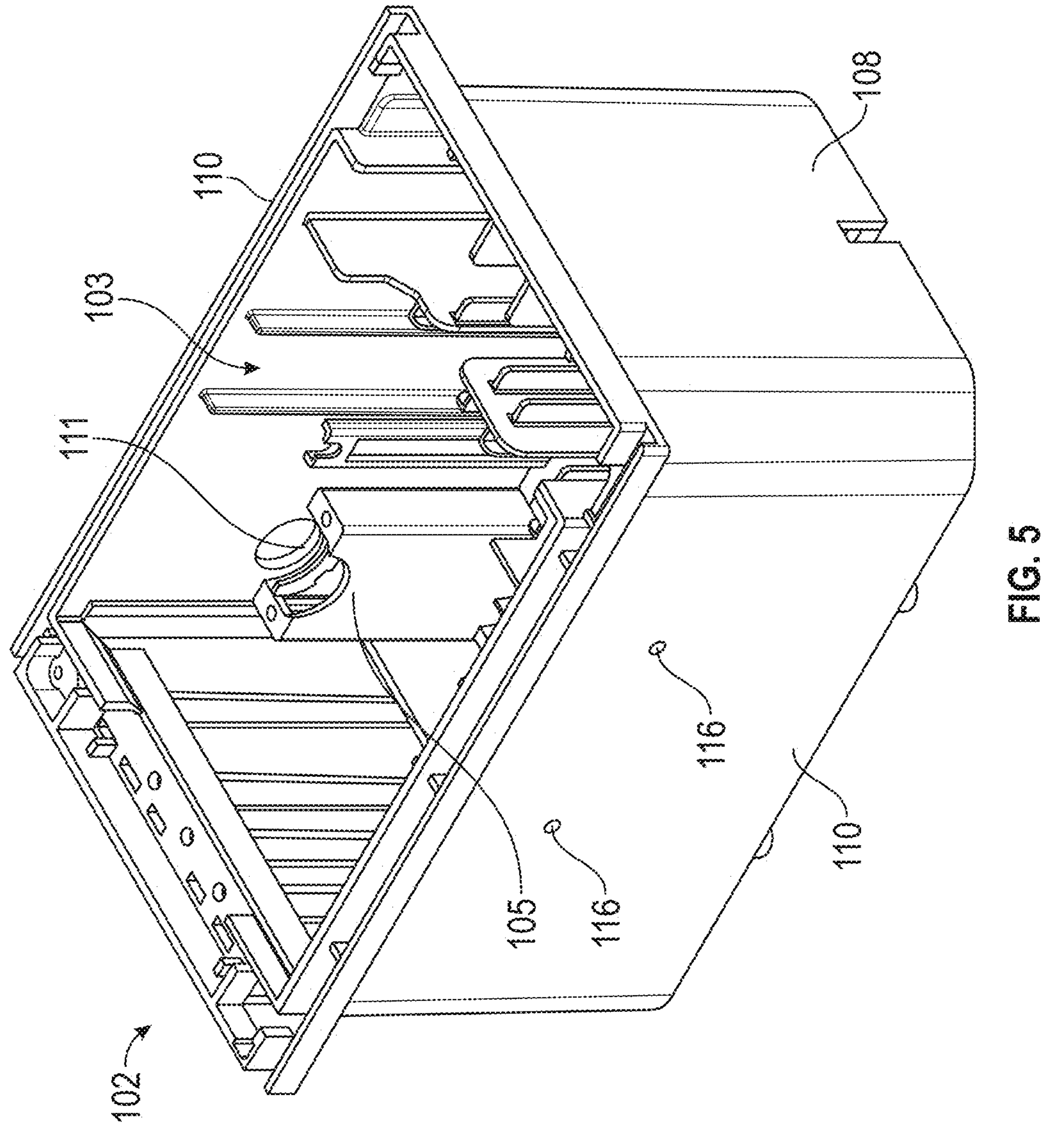
FIG. 5 shows a perspective view of the body of the electrical box of FIG. 1.
Figure 6:
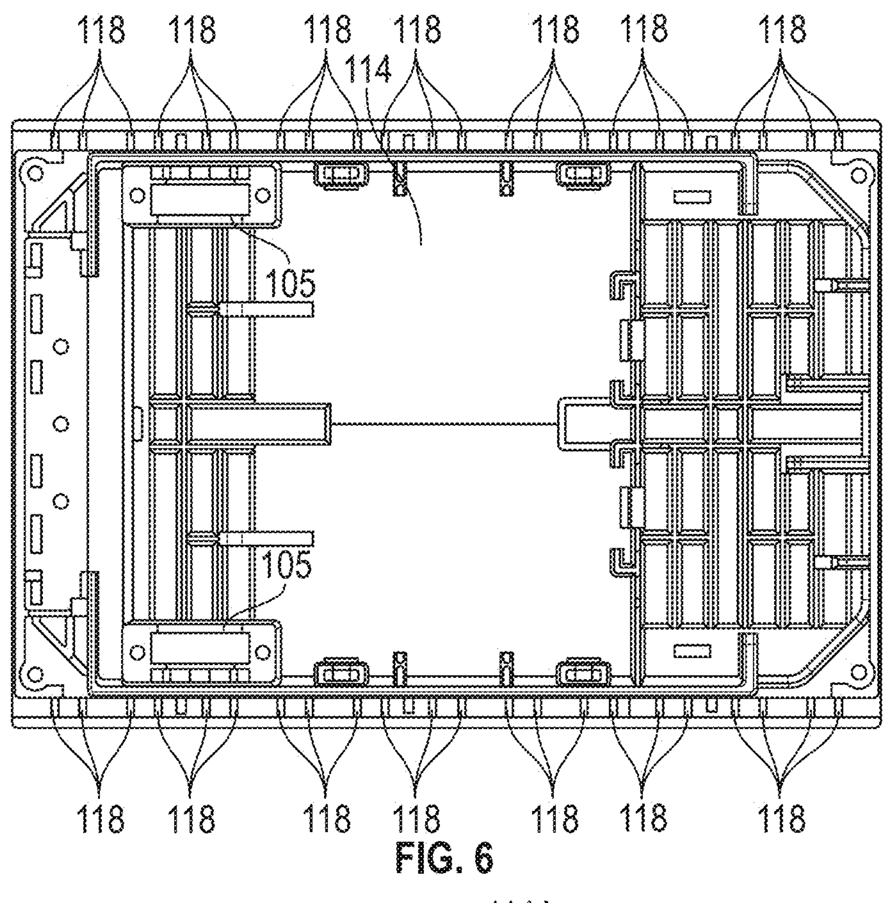
FIG. 6 shows a top view of the body of FIG. 5.
Figure 6A:
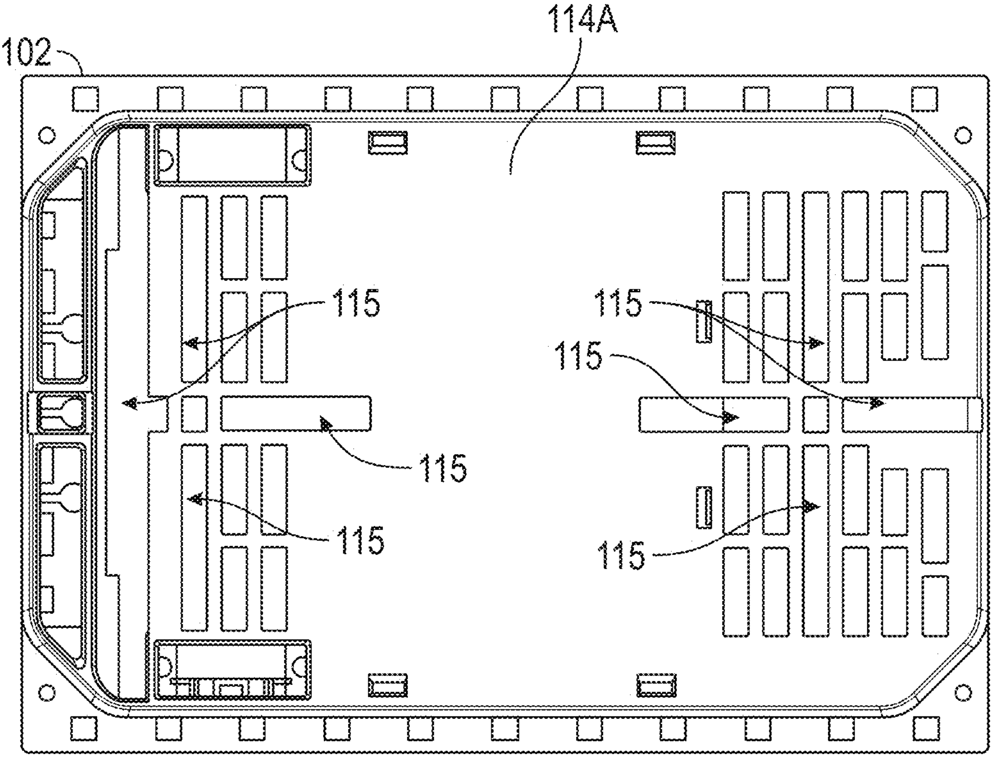
FIG. 6A shows a bottom view of the body of FIG. 5.

Referring to FIGS. 5, 6 and 6A, the body 102 has a front wall 108, two opposing sidewalls 110, a back wall 112 and a bottom 114. The body 102 defines an interior space 103 that is open at the top. The body 102 also includes two pivot supports 105 arranged at opposite sides of the body 102 within the interior space 103. The pivot supports 105 are shaped to support pivot extensions of a device box enclosure, which is discussed in greater detail below.

One of the sidewalls 110 defines a wiring opening 111 for permitting electrical wiring and/or data wiring to enter the interior space 103 from an area external to the body 102. In the embodiment shown, the wire opening 111 is aligned with a central vertical longitudinal axis of the pivot supports 105. The sidewalls 110 each define two side openings 116 for attaching the respective adjustable mounting brackets 106 with the fasteners 107. The fasteners 107 can be loosened and/or detached from the body 102 in order to adjust the mounting brackets 106 to a different position in the vertical direction and then fastened and/or attached to the body 102 to secure the adjustable mounting brackets 106 at the different position. The fasteners 107 can be any known fastener type. For example and without limitation, the fasteners 107 can be stainless steel screws. While only two side openings 116 are shown, more or less side openings 116 and/or fasteners 107 are within the scope of the present disclosure. The sidewalls 110 further define top channel openings 118 configured to drain water away from the interior space 103 of the body 102.

The body 102 of the electrical box 10 is configured to mount to known support structures for supporting an outdoor raised surface. In particular, an exterior bottom surface 114A of the bottom 114 of the body 102 includes a first connection geometry 115 that is configured to engage with a connection geometry of a support structure 200 such that, when engaged, the body 102 is securely held by one or more of the support structures 200. In FIGS. 1-4, the electrical box 10 is shown as being supported by two known adjustable floor support structures 200, which in this embodiment are Skyjack Pedestals by Skydeck USA. The first connection geometry 115 may be configured to engage with the connection geometry of virtually any known support structure type. One aspect of the present disclosure is the feature that the body 102 of electrical box 10 may be adapted to engage with a same type of support structure used to support a raised floor surface, such as a roof deck or roof patio, whether manufactured of tile, stone, wood or composite material, or the like.

In addition to functioning as structural means for engaging with a connection geometry of support structures, the first connection geometry 115 may optionally comprise one or more holes or openings that function to drain water within the interior space 103 to an area outside the body 102.

Figure 7:
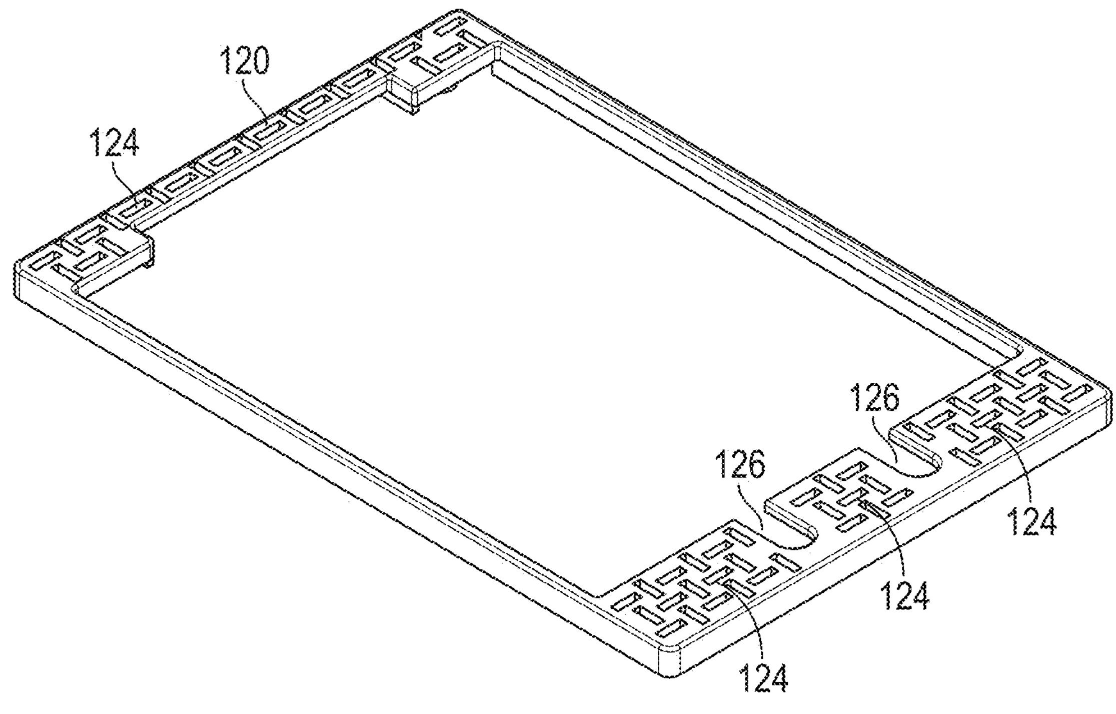
FIG. 7 shows a perspective view of a cover flange of the cover of the electrical box of FIG. 1.
Figure 8:
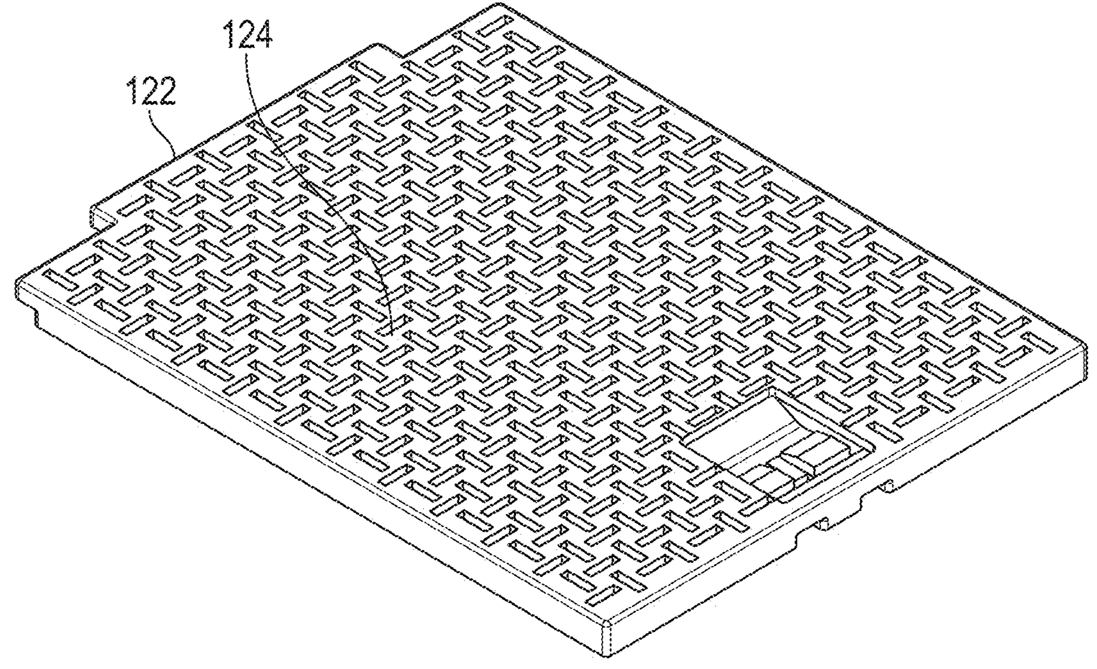
FIG. 8 shows a perspective view of a cover door of the cover of the electrical box of FIG. 1.

Referring to FIGS. 7 and 8, the cover 104 includes a cover flange 120 and a cover door 122 configured to connect with the body 102 through a hinge connection (discussed in greater detail below) or any other connection that allows a user to move the cover door 122 relative to the body 102 and/or cover flange 120 to reveal the interior space 103 of the body 102 when the cover 104 is connected to the body 102. In certain embodiments, the cover door 122 may be replaceable so that is can be replaced when worn or broken.

The cover flange 120 and the cover door 122 may be configured with an anti-slip top surface design 124. Further, the cover flange 120 may define two cable egress spaces 126. In FIG. 7, the cable egress spaces 126 are shown without the brushes 127 shown in FIG. 4. In some embodiments, the cable egress spaces 126 are brush-filled with one or more brushes 127 (FIG. 4) that are configured to conform to power cords or wires that pass through the cable egress space 126 and serve to stop or inhibit the ingress of water that may run down the cords or wires in order to prevent the water from reaching interior space 103 of the body 102. In some embodiments, the brushes 127 (FIG. 4) are nylon bristles. More or less cable egress spaces 126 defined by the cover flange 120 and/or the cover door 122 are within the scope of the present disclosure.

In some embodiments, the cover door 122 is configured to self-close when released from a user's grip. The self-closure may be driven by gravity due to a lack of resistance in the hinge connection of cover door 122 to the cover flange 120, or the self-closure may be driven by any known self-closure mechanism.

Figure 9:
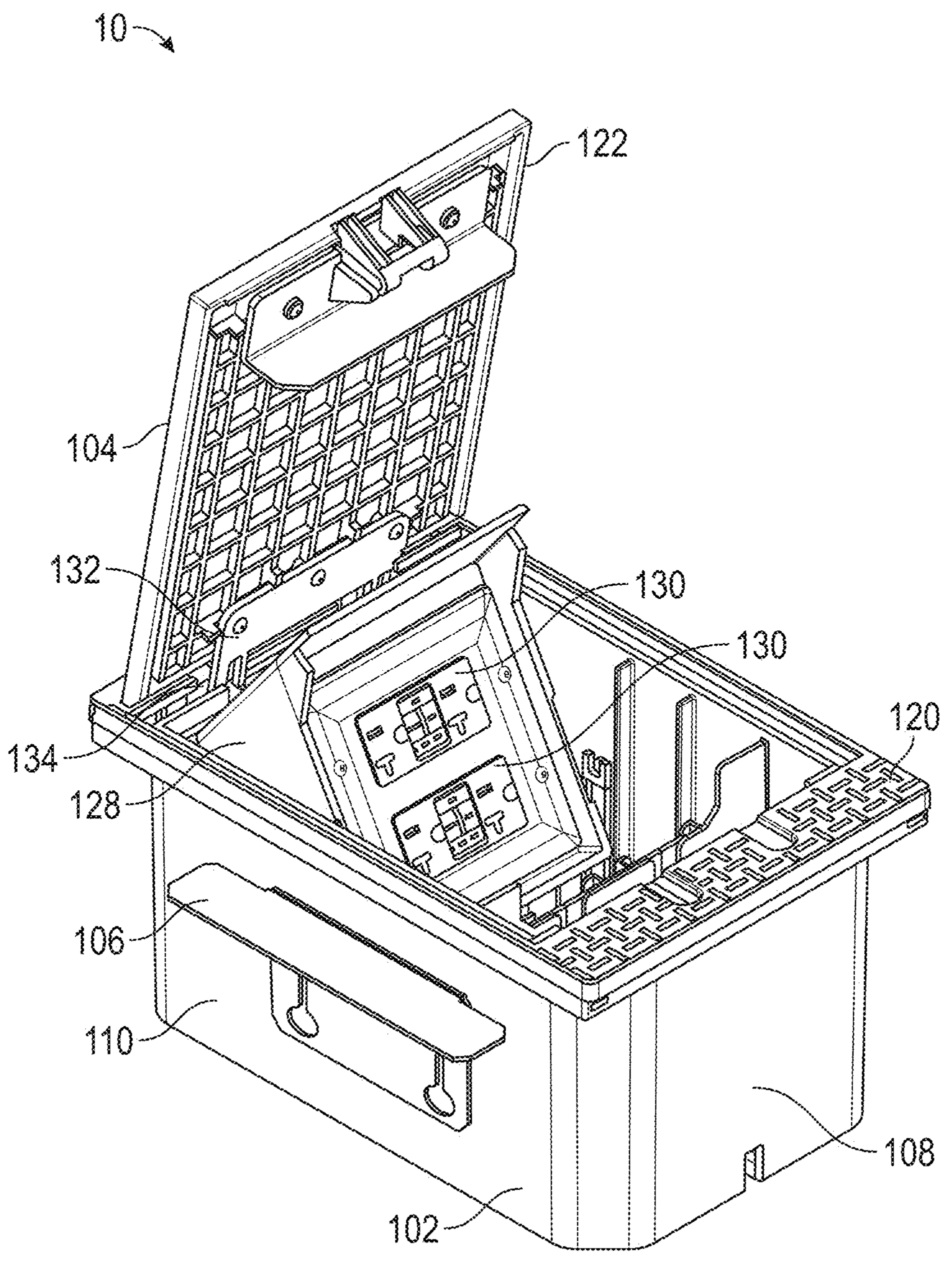
FIG. 9 shows a perspective view of the electrical box of FIG. 1 with the cover door in an open position.

Referring to FIG. 9, the electrical box 10 of FIG. 1 is shown with the cover door 122 in a fully open position, which reveals a device box enclosure 128 containing electrical receptacle devices 130 arranged therein. The hinge connection of the cover door 122 to the body 102 is accomplished through a hinge 132 mounted to the cover door 122 (e.g. with screws, bolts, or the like) and a hinge bracket 134 mounted to the body 102. In some embodiments, the hinge connection of the cover door 122 to the body 102 is arranged such that a maximum opening degree of the cover door 122 is less than 90° from a fully closed position to the fully open position (e.g. a maximum opening degree of 88°) which ensures the cover door 122 will always be driven by gravity to close when released from a user's grip in embodiments where the cover door 122 is arranged for self-closure with a gravity driven configuration, as discussed above. Advantageously, this self-closure arrangement may ensure the electrical box 10 complies with various zoning requirements, building codes, and/or other policies that require outdoor electrical connections be protected from the elements or hidden from public exposure when not in use.

Figure 10:
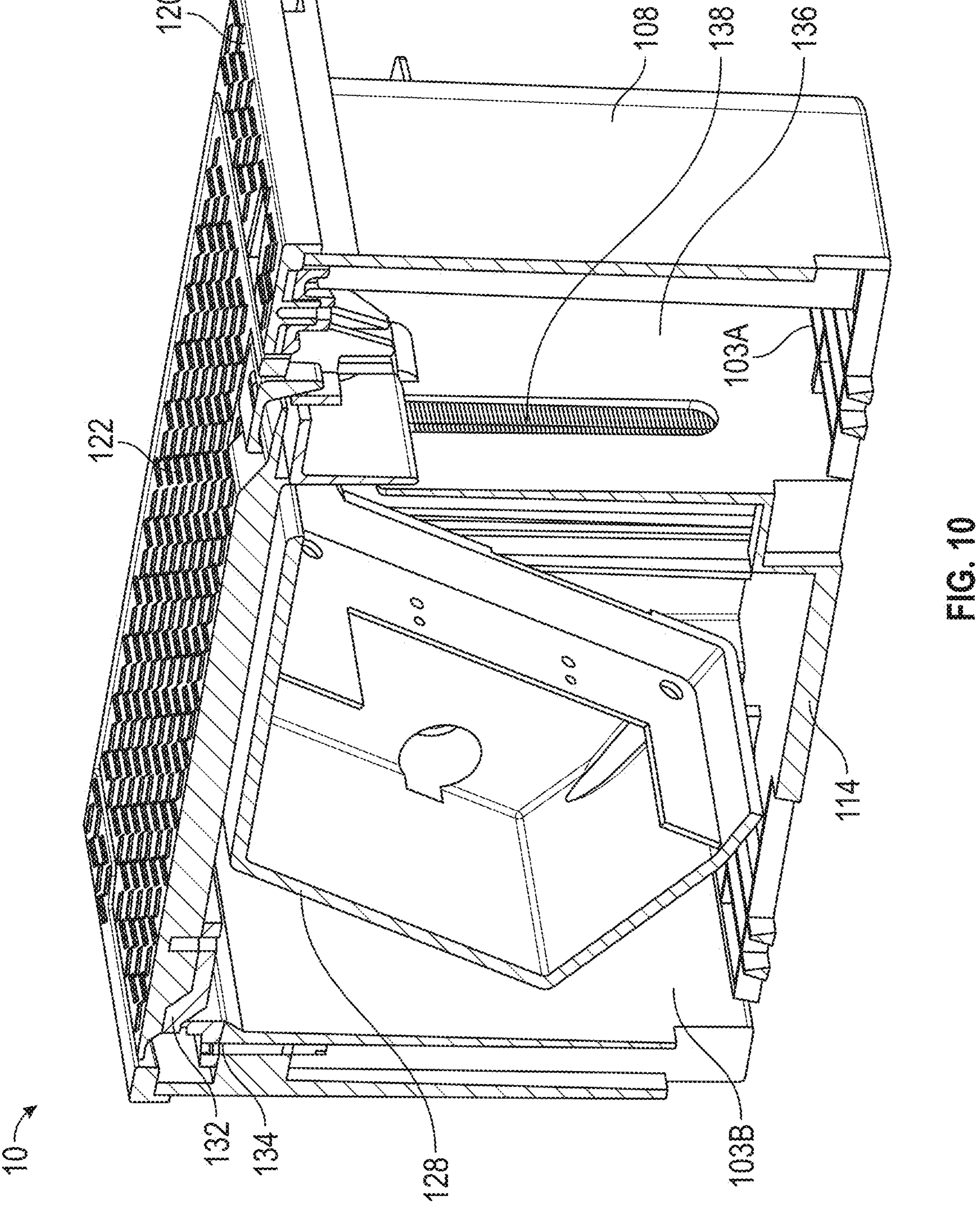
FIG. 10 shows a perspective, sectional view of the electrical box of FIG. 1.

Referring to FIG. 10, a section view of the electrical box of FIG. 1 is shown with the electrical receptacle devices 130 (shown in FIG. 9) not shown for clarity and the cover door 122 arranged in a fully closed position. This sectional view shows that the interior space 103 comprises a front interior space 103A and a rear interior space 103B that are separated by a partition wall 136. The partition wall 136 comprises two brush-filled partition openings 138 (the other brush-filled opening is in the section of the electrical box 10 not shown in FIG. 10 due to the sectional view, but is identical or substantially similar to the shown brush-filled partition opening 138) that connect the front interior space 103A to the rear interior space 103B. More or less brush-filled partition openings 138 are within the scope of the present disclosure. The brush-filled partition opening(s) 138 include one or more brushes configured to conform to power cords or wires that pass through the brush-filled partition opening 138 and serve to stop water that may run down the cords or wires in order to prevent the water from reaching the rear interior space 103B, receptacle devices 130 and/or device box enclosure 128. In some embodiments, the brushes are nylon bristles.

The device box enclosure 128 is shown in FIG. 10 arranged in the rear interior space 103B in a resting position when the cover door 122 is in the fully closed position. In the resting position, a front face of the device box enclosure 128 is angled downwards such that the faces of the electrical receptacle devices 130 (FIG. 9) are facing in an at least a partially downward direction towards the bottom 114, which advantageously protects cords or wires from water while in use such that, when in use, any water that does advance beyond the brush-filled opening 138 along the cords or wires is pulled by gravity away from the receptacle devices 130 and/or device box enclosure 128.

Figure 11:
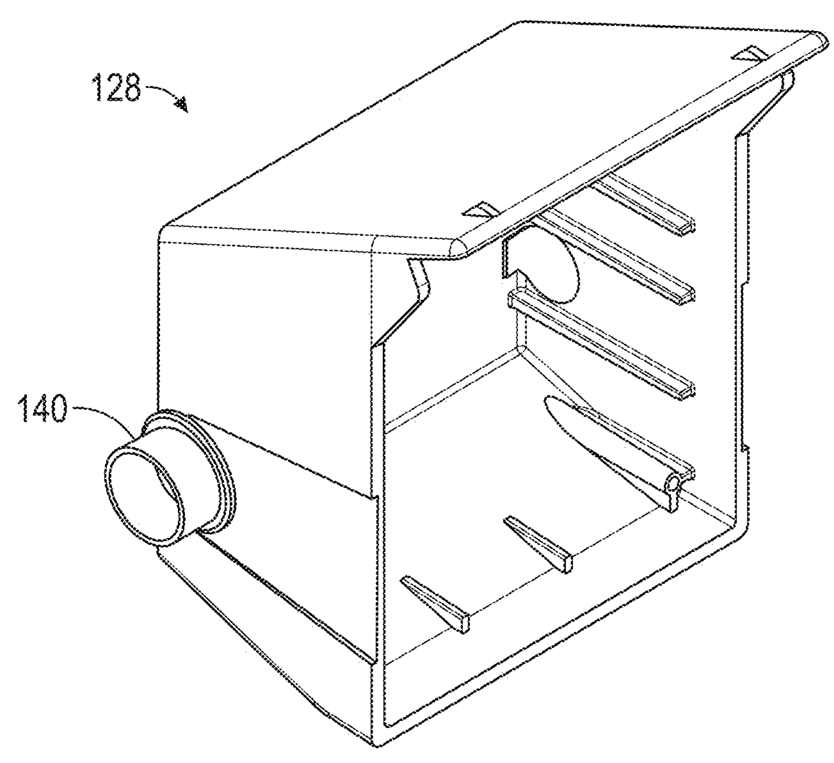
FIG. 11 shows a perspective view of a device box enclosure of the electrical box of FIG. 1.
Figure 12:
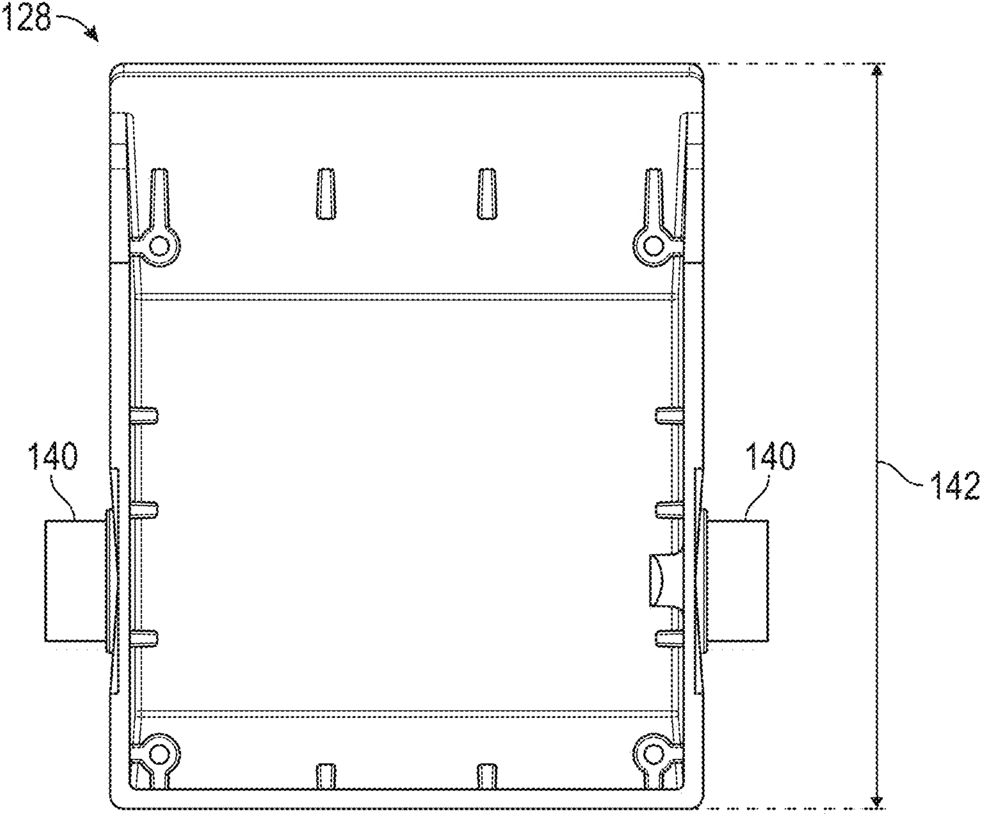
FIG. 12 shows a front view of the device box enclosure of FIG. 11.

Referring to FIGS. 11 and 12, the device box enclosure 128 is shown in greater detail. The device box enclosure 128 includes two pivot elements 140 locating on opposing sides of the device box enclosure 128. The pivot elements 140 are configured to rest within the pivot supports 105 (FIGS. 5 and 6) and allow for the device box enclosure 128 to pivot and/or rotate from the resting position shown in FIG. 10 to an accessible position shown in FIG. 9 when moved by a user. When the device box enclosure 128 is in the accessible position, the electrical receptacle devices 130 (or other electrical/data connection point(s)) are facing at least partially upwards so that a user can access the receptacle devices 130. The pivot elements 140 are located off-center in a vertical direction 142 of the device box enclosure 128, closer to a bottom of the device box enclosure 128, to ensure that the device box enclosure 128 is driven by gravity to pivot and/or rotate from the accessible position to the resting position when released from the grip of a user.

Thus, both the device box enclosure 128 and the cover door 122 are configured to automatically close to a closed/resting position when released from the grip of a user, thereby automatically shielding device contained in the device box enclosure 128 (e.g. electrical receptacle devices 130) from exposure to water. In the shown embodiment, the movement of the device box enclosure 128 is independent from the movement of the cover door 122. In some embodiments, the device box enclosure 128 is connected or associated with the cover door 122 such that the device box enclosure 128 moves, pivots and/or rotates with the cover door 122, or the movement of the cover door 122 from the fully closed position to the fully open position effectuates the moving, pivoting and/or rotation of the device box enclosure 128 from the resting position to the accessible position.

Figure 13:
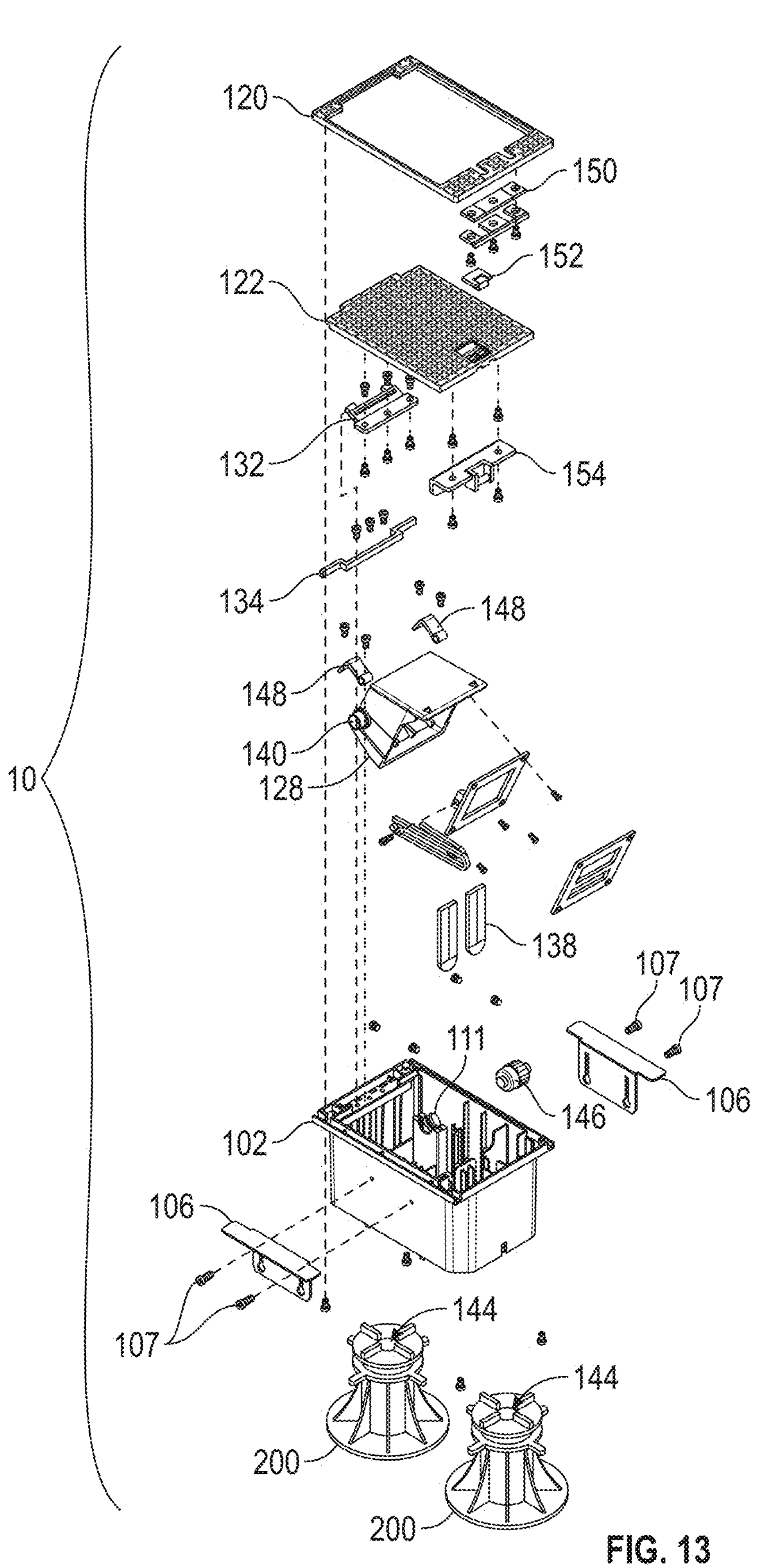
FIG. 13 shows an exploded view of the electrical box and support structures of FIG. 1.

Referring to FIG. 13, an exploded view of the electrical box 10 and support structures 200 of FIG. 1 is shown. From this exploded view, the connection geometry 144 of each of the support structures 200 is visible and, as discussed above, the first connection geometry 115 of the body 102 engages with the connection geometry 144 to securely and rigidly support the electrical box 10 when installed and in use. A liquid-tight conduit connector 146 is shown for fitting within wiring opening 111. The liquid-tight conduit connector 146 may be flexible and non-metallic, but any liquid-tight conduit fittings are within the scope of the present disclosure. Clamps 148 for retaining the pivot elements 140 of the device box enclosure 128 on the pivot supports 105 of the body 102. The clamps 148 are configured to be fastened to the body 102 through the use of fasteners, e.g. screws, nails, pins, or the like.

An egress rubber 150 can also be used to prevent water from entering the electrical box 10 through the cable egress space(s) 126. The egress rubber 150 (e.g. silicone) is configured to conform to the cables inserted in the egress cable spaces 126 during use, and is also configured to seal and prevent water from entering the body 102 when no cables are arranged within the cable egress space(s) 126.

A latch handle 152 is shown for engaging a latch 154 secured to the cover 104. In some embodiments, the latch 154 is a molded one-piece design that requires no assembled parts such as springs. The latch 154 is activated by pulling up on the latch handle 152. In some embodiments, a built-in stop prevents over flexing of the latch 154.

Figure 14:
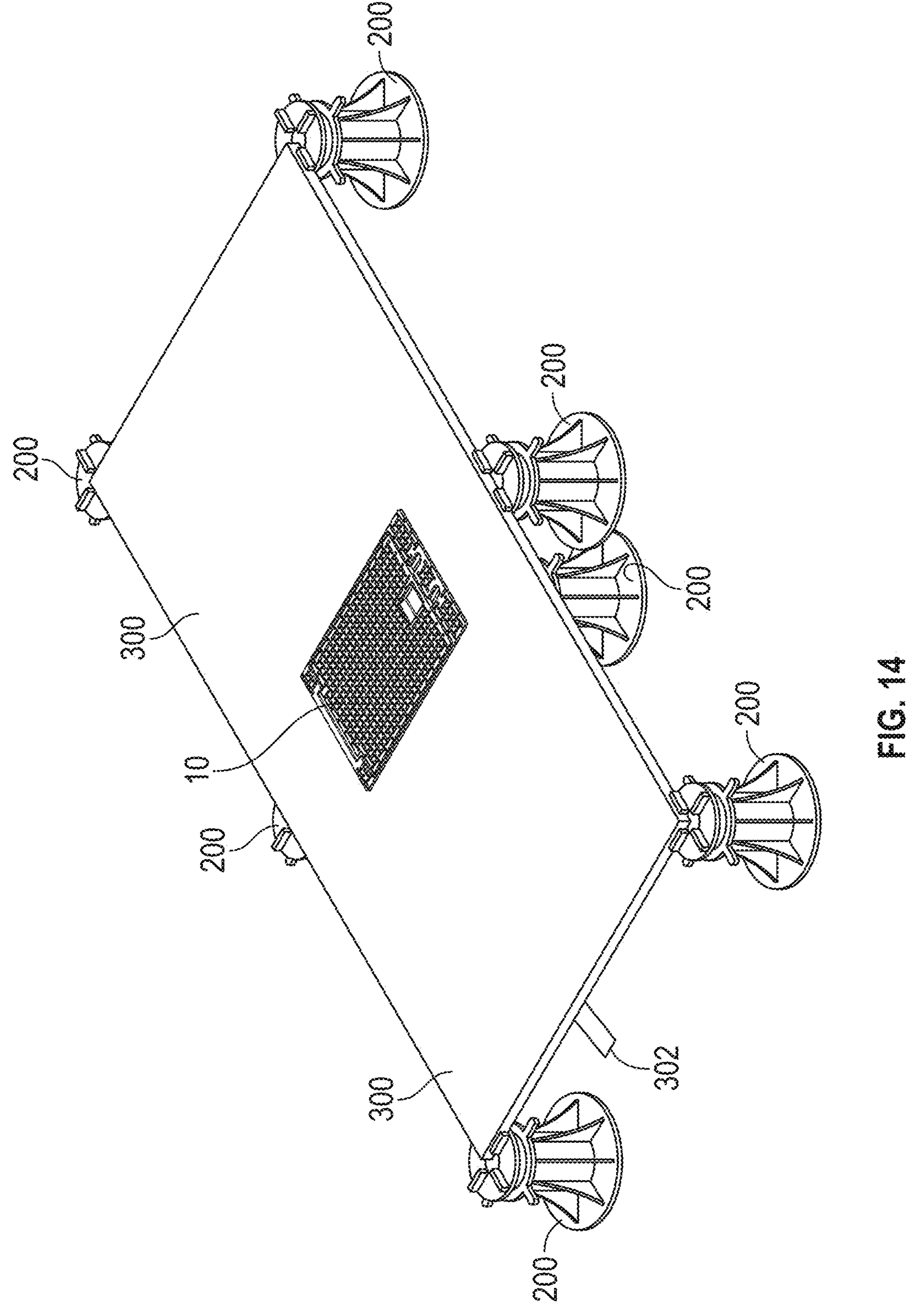
FIG. 14 shows the electrical box of FIG. 1 installed with floor material.

Referring to FIG. 14, the electrical box 10 and support structures 200 of FIG. 1 are shown installed with floor tiles 300. Adjacent floor tiles 300 are supported by the flanges of the adjustable mounting brackets 106 of the electrical box 10. The floor tiles 300 are also supported by additional support structures 200 of the same type as the support structure(s) 200 supporting the electrical box 10. Advantageously, when installed and/or when in use, a top surface of the cover 104 is flush with a top surface of adjacent floor tiles 300. Specifically, a top surface of the cover flange 120 and/or a top surface of the cover door 122 are flush with the top surfaces of the adjacent floor tiles 300. This is an improvement over conventional electrical boxes that require the cover flange (and/or other parts or portions of the cover) to rest on top of the top surface of adjacent floor tiles to support the electrical box, which presents a trip hazard and unsightly aesthetics since a top surface of the cover flange is raised to a different height form the top surface of the adjacent floor tiles.

Since the adjustable mounting brackets 106 can be adjusted to be secured at different positions in the vertical direction 142 by loosening and/or detachment of the fasteners 107 and tightening and attachment of the fasteners with the mounting brackets 106 as a different position, it is possible to adjust the position of the mounting brackets 106 to a position that ensures a top surface of the electrical box 10 and/or cover 104 is flush with the adjacent floor tiles (or other floor material) when the floor material rests on the mounting brackets 106. Thus, the electrical box 10 is configurable to remain flush with adjacent floor material of different thicknesses in the vertical direction 142, i.e. the thickness 302 of each floor material 300.

As discussed above, the support structures 200 are known support structures (or "mounting pedestals") made in a variety of different sizes, types and materials by a variety of different manufacturers. The electrical boxes 10 according to the present disclosure may advantageously be adapted to engage with and/or be supported by any kind of support structure 200, known now or later developed. In some embodiments, the bottom surface of the bottom 114 of the body 102 is adapted to engage with and/or be supported by a plurality of different support structure, e.g. for a plurality of different branded support structure products.

The electrical boxes 10 of the present disclosure are advantageously more easily and efficiently installed since no differing support structure 200 materials are needed for the electrical box 10 relative to the floor surface material(s) and the installation technician can easily install the electrical box 10 with a same type of support structure 200 being used to install the floor surface material, e.g. the deck or patio surface material. While the electrical boxes 10 of the present disclosure have been shown and described as being installed with flooring tiles 300, it is within the scope of the present disclosure for the electrical boxes 10 to be installed with any flooring surface material suitable for use with mounting with adjustable mounting brackets (e.g. adjustable mounting brackets 106).

Although features of the present disclosure have been described in connection with different embodiments for simplicity, one of ordinary skill in the art should readily understand that various features may be applicable to, and readily incorporated, into other embodiments.

As will be recognized by those of ordinary skill in the pertinent art, numerous changes and modifications may be made to the above-described embodiments of the present disclosure without departing from the spirit of the invention. For example, installation indoors and/or installation on or within vertical surfaces may also be accommodated. Accordingly, the particular embodiments described in this specification are to be taken as merely illustrative and not limiting.

What is claimed is:

1. An electrical box comprising:
a body defining an interior space;
a cover attached to the body, the cover including a cover door configured to be moved from a closed position to an open position;
two adjustable mounting brackets arranged on opposite sides of the body each configured to support a floor material; and
a device box enclosure configured to be in a resting position when the cover door is in a closed position;
wherein the adjustable mounting brackets are configured to be adjusted to a plurality of different positions in a vertical direction of the body; and
wherein an opening face of the device box enclosure is configured to face in an at least partially downward facing direction when the device box enclosure is in the resting position.

2. The electrical box of claim 1, wherein the device box enclosure is moveably arranged within the interior space to rotate and/or pivot from the resting position to an accessible position when moved by user.

3. The electrical box of claim 2, wherein the device box enclosure is configured to automatically move from the accessible position to the resting position when released by the user.

4. The electrical box of claim 3, wherein the cover door is configured to automatically move from the open position to the closed position when released by the user.

5. The electrical box of claim 4, wherein the cover is arranged such that a maximum opening degree of the cover door is 88°.

6. The electrical box of claim 1, wherein the cover comprises an anti-slip top surface design.

7. The electrical box of claim 1, wherein an exterior surface of a bottom of the body includes a first connection geometry, and wherein the first connection geometry is configured to engage with a connection geometry of a support structure such that the body is securely supported by the support structure when the first connection geometry is engaged with the connection geometry.

8. The electrical box of claim 7, wherein the first connection geometry includes one or more openings that are configured to drain water from within the interior space to an area outside the body.

9. The electrical box of claim 1, further comprising a partition wall, wherein the interior space comprises a front interior space and a rear interior space and the partition wall is arranged between the front interior space and the rear interior space.

10. The electrical box of claim 9, wherein the partition wall comprises one or more brush-filled partition openings, wherein brushes of the one or more brush-filled openings are configured to conform to power cords when inserted therethrough.

11. An electrical box comprising:
a body defining an interior space;
a cover attached to the body, the cover including a cover door configured to be moved from a closed position to an open position; and
a device box enclosure configured to be in a resting position when the cover door is in a closed position;
wherein an exterior surface of a bottom of the body includes a first connection geometry, and wherein the first connection geometry is configured to engage with a connection geometry of a support structure such that the body is securely supported by the support structure when the first connection geometry is engaged with the connection geometry; and
wherein an opening face of the device box enclosure is configured to face in an at least partially downward facing direction when the device box enclosure is in the resting position.

12. The electrical box of claim 11, wherein the device box enclosure is moveably arranged within the interior space to rotate and/or pivot from the resting position to an accessible position when moved by user.

13. The electrical box of claim 12, wherein the device box enclosure is configured to automatically move from the accessible position to the resting position when released by the user.

14. The electrical box of claim 13, wherein the cover door is configured to automatically move from the open position to the closed position when released by the user.

15. The electrical box of claim 14, wherein the cover is arranged such that a maximum opening degree of the cover door is 88°.

16. An electrical box comprising:
a body defining an interior space;
a cover attached to the body, the cover including a cover door configured to be moved from a closed position to an open position;
two adjustable mounting brackets arranged on opposite sides of the body each configured to support a floor material; and
a partition wall;
wherein the adjustable mounting brackets are configured to be adjusted to a plurality of different positions in a vertical direction of the body;
wherein the interior space comprises a front interior space and a rear interior space and the partition wall is arranged between the front interior space and the rear interior space; and
wherein the partition wall comprises one or more brush-filled partition openings, wherein brushes of the one or more brush-filled openings are configured to conform to power cords when inserted therethrough.

* * * * *